Oct. 23, 1934.   E. B. HOUGH   1,977,912
AUTOMATIC CLUTCH CONTROL
Filed Jan. 11, 1932
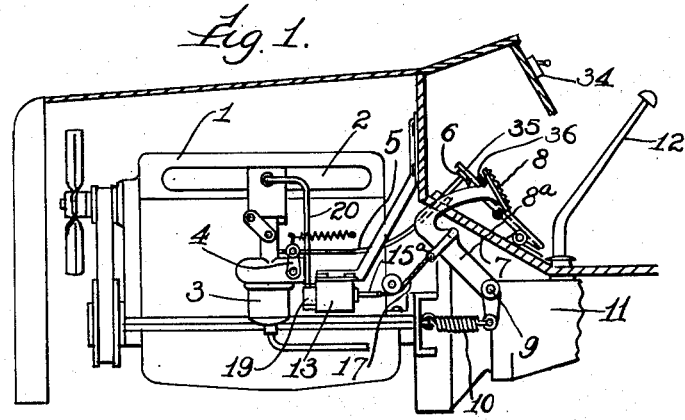
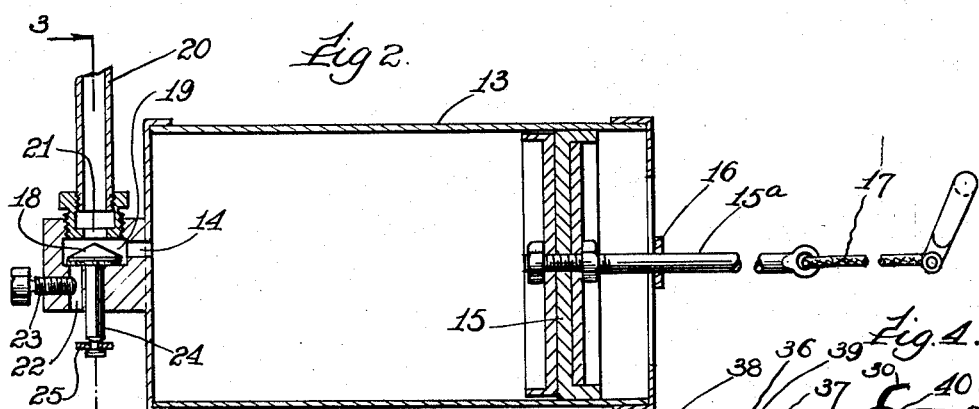
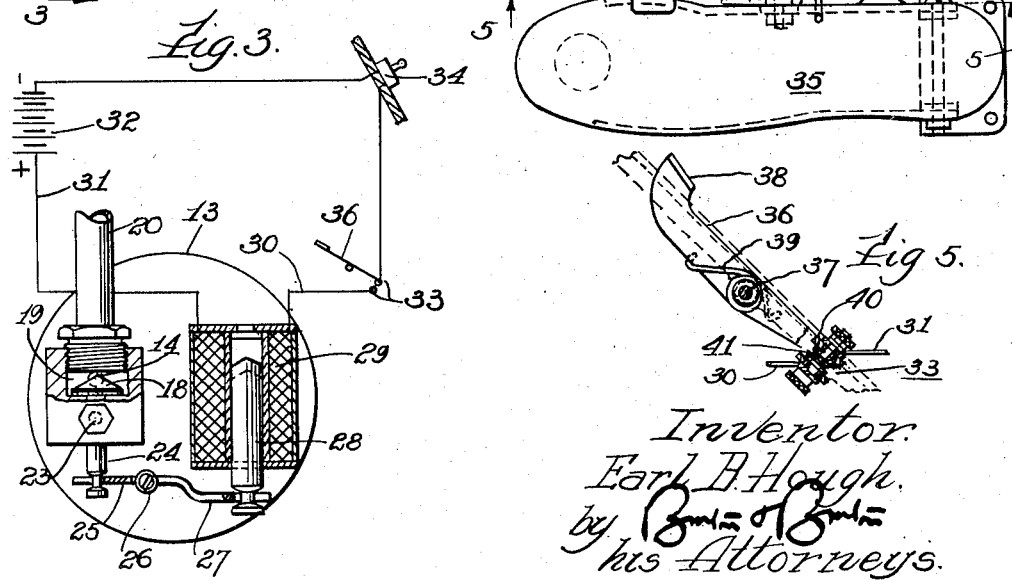
Inventor
Earl B. Hough.
by his Attorneys.

Patented Oct. 23, 1934

1,977,912

UNITED STATES PATENT OFFICE 1,977,912

AUTOMATIC CLUTCH CONTROL

Earl B. Hough, Chicago, Ill., assignor to Electro-Vac Free Wheeling Co., Chicago, Ill., a corporation of Illinois Application January 11, 1932, Serial No. 585,816

5 Claims. (Cl. 192—.01)

This invention relates to automotive vehicles, such as automobiles and motor trucks, and is particularly concerned with simplifying the control of such vehicles by the driver. Its object is to provide power-actuated means for automatically shifting the clutch which serves as the power-transmitting connection between the engine and running gear, so that the driver is relieved of this operation during most of the normal handling of the vehicle. Another object is to arrange for control of such power-actuated means in conjunction with the operation of the usual throttle pedal or accelerator which controls the engine speed, and a further object is to arrange such control so that it may be eliminated at will, permitting the usual actuation of the clutch by the foot pedal. The invention thus consists in certain features and elements of construction in combination with each other and with the essential parts of an automotive vehicle as herein shown and described, and as indicated by the claims.

In the drawing:

Figure 1 is a diagrammatic side elevation showing the general outline of the internal combustion engine which provides motive power for the vehicle, together with the clutch-actuating devices which are the subject of this invention.

Figure 2 is a vertical section taken substantially through the axis of the clutch-operating cylinder and its valve.

Figure 3 is a detail section taken as indicated at line 3—3 on Figure 2.

Figure 4 is a detail plan view of the accelerator pedal and a control switch for the clutch-actuating device.

Figure 5 is a side elevation of the switch pedal being taken substantially as a section at line 5—5 on Figure 4.

In the operation of a motor vehicle of the type employing an internal combustion engine and a multiple speed transmission, it is ordinarily necessary to disengage the clutch while shifting gears from one speed to another, and, of course, the clutch is always disengaged in the operation of stopping the vehicle and applying the brakes. Usually in shifting from one speed ratio to another the engine is temporarily accelerated while the clutch is engaged in order to ensure ample fly-wheel momentum for picking up the load at the next higher speed ratio when the clutch is again engaged, and usually it becomes automatic for the driver to throttle down his engine in disengaging the clutch to prevent racing the motor by the sudden release of the load. Thus the operation of the accelerator pedal and the operation of the clutch pedal are closely related. My invention makes it possible for the driver to disregard the clutch pedal in most instances and secure clutch operation in conjunction with his normal use of the accelerator pedal.

The engine is indicated at 1 in the drawing, and its intake manifold is shown at 2, leading from the carburetor, 3, whose throttle lever, 4, is connected by a link, 5, with the usual accelerator button, 6, over the floor board, 7. The clutch-operating pedal is shown at 8, mounted to swing about the axis, 9, and held normally in clutch-engaging position as by means of a spring, 10. The clutch pedal is associated with the multiple speed transmission gearing whose housing is indicated at 11, and whose gears shift lever is shown at 12. Details of this transmission may be of any conventional type and need not be further described.

For the purpose of this invention I provide a cylinder, 13, having a suction inlet, 14, at one end and a suction-actuated piston, 15, whose stem, 15ª, is guided in a spider, 16, and connected by a flexible coupling such as a cable, 17, to the arm, 8ª, of the clutch pedal, 8. With the arrangement shown it will be seen that suction acting through the inlet, 14, will cause movement of the piston, 15, toward the inlet, 14, placing the cable, 17, under tension and moving the clutch pedal arm, 8ª, in the direction for disengaging the clutch. The application of suction to the cylinder, 13, is controlled by a valve, 18, whose valve chamber, 19, communicates through a tube, 20, with the inlet manifold, 2, of the engine. The valve, 18, is normally seated to close the port, 21, connecting the chamber, 19, with the tube, 20, and the chamber, 19, is thus normally vented to atmosphere through a bleed port, 22, provided with a regulating screw, 23. The stem, 24, of the valve, 18, is guided in the wall of the chamber, 19, and outside the chamber is engaged with the shorter arm, 25, of a lever fulcrumed at 26, and having its longer arm, 27, similarly engaged with the core or plunger, 28, of a solenoid, 29. The solenoid may be connected to any suitable source of electrical energy such as the ignition battery or generator of the vehicle and suitably controlled by electric switching means so that when it is energized the core or plunger, 28, is drawn upwardly, thus rocking the short arm, 25, of the lever downwardly and pulling open the valve, 18, for admitting suction from the pipe, 20, through the port, 21, to chamber, 19, and thence through the inlet, 14, to the cylinder, 13. When the circuit of the solenoid 29, is broken the plunger, 28, will drop, thus causing the short end of the lever, 25, to rise and close the valve, 18, or permit the suction in the line, 20, to draw it to its seat; and when thus closed the valve uncovers the bleed port, 22, permitting the cylinder, 13, to be vented to the atmosphere at such a rate as the adjustment of the regulating screw, 23, will allow.

In Figure 3 the lead wires, 30 and 31, are shown as providing a circuit for the solenoid, 29, through the battery, 32, and two switches, 33 and 34, the latter being located on the dash or instrument board, and the former being associated with the throttle pedal, 35. Figure 4 shows an operating pedal, 36, for the switch, 33, fulcrumed at 37 on the side or edge of the throttle pedal, 35, and having a small foot piece, 38, which may overhang the throttle pedal, as shown in Figure 5, or which may merely project above the upper surface thereof in its normal position as maintained by its spring, 39. At the opposite end the pedal lever, 36, carries a contact, 40, adapted to cooperate with a contact, 41, fixed on the accelerator pedal, 35, and these two contacts, 40 and 41, constitute the switch device represented diagrammatically at 33 in Figure 1. Thus it will be apparent that the operator may place his foot on the throttle or accelerator pedal, 35, without engaging the foot piece, 38, of the lever, 36, or he may so place his foot that it will overlap said foot piece, 38, and depress it. Normally when the engine is started and the spring, 39, holds the switch, 33, closed, the solenoid, 29, will hold open the valve, 18, permitting the suction to act in the cylinder, 13, for holding the clutch out of engagement. When the driver places his right foot upon the accelerator pedal, 35, he will normally step on the foot piece, 38, and thus open the switch, 33; at the same time he will engage the clutch pedal, 8, with his left foot, and thus hold the clutch out of engagement until he is ready to start the vehicle. Having shifted into low gear and engaged the clutch, he may then take his left foot from the clutch pedal. Presently, for shifting to one of the higher gear ratios, he will lift his right foot entirely from the accelerator pedal, 35, and at the same time release his pressure upon the foot piece, 38, thus permitting the switch at 33 to close for energizing the solenoid, 29, and pulling open the valve, 18.

Similarly, for each change of gear ratio it is only necessary for the driver to lift his foot from the accelerator pedal and thus simultaneously cause the engine to idle and the clutch to be disengaged while the gears are being shifted; replacing his foot upon the accelerator pedal, 35, in position to overlap the foot piece, 38, of the lever, 36, opens the switch, 33, and permits the clutch to be again engaged by the spring, 10, or such other means as may be provided in the regular vehicle structure. Likewise, whenever it is desired to allow the vehicle to coast so as to economize in fuel the driver will lift his foot from the accelerator pedal, thus releasing pressure on the foot piece, 38, and closing the switch, 33; this immediately energizes the solenoid, 29, and opens the valve, 18, applying suction to the cylinder, 13, and disengaging the clutch.

The switch, 34, shown on the dash in Figure 1, and included in the wiring diagram of Figure 3, is connected in series in the circuit of the solenoid, 29, so that if so desired the automatic operation of the clutch by the suction cylinder, 13, can be dispensed with entirely, at will. Merely by throwing the switch, 34, to open position the operator can prevent the solenoid, 29, from being energized by the actuation of the switch lever, 36, and thus will prevent the clutch from being disengaged at any time by the suction mechanism,—requiring normal foot operation of the clutch pedal in the same manner as though the vehicle were not equipped with my invention. Under certain driving conditions this may be desirable.

It may be noted that while the pedal or lever, 36, is mounted in close association with the accelerator pedal, 35, so that when desired it may be actuated simultaneously therewith, the movement of the lever, 36, does not depend upon movement of the accelerator pedal, 35, and, in fact, this movement may be accomplished to some extent independently of that of the accelerator. When driving at high speed, it may not be desirable to suddenly reduce the engine speed to its minimum or idling point, but, if desired, the automatic disengagement of the clutch may be accomplished merely by rocking the foot on the pedal, 35, so as to relieve the foot piece, 38, of pressure, or the same effect may be secured by shifting the foot laterally enough so that it will no longer overlap the part 38 of the part 36.

While there is shown and described herein certain specific structure embodying the invention, it will be manifest to those skilled in the art that various modifications and re-arrangements of the parts may be made without departing from the spirit and the scope of the invention, and that the same is not limited to the particular form herein shown and described, except in so far as indicated by the appended claims.

I claim:

1. In a motor vehicle having an engine, a clutch, and an accelerator pedal for the engine, a suction-actuated motor connected for disengaging the clutch, a source of suction and a valve controlling communication between the latter and said suction motor, together with an electrically-actuated device connected to said valve for opening it, and a foot-operated control switch for said electrical device mounted on the accelerator pedal, said control switch being in the form of a pedal lever fulcrumed on the accelerator pedal with a foot piece projecting above the upper surface of said pedal in position to be depressed by the same foot as that which the driver uses to operate said accelerator pedal.

2. In a motor vehicle having an engine, a clutch, and an accelerator pedal for the engine, a suction-actuated motor connected for disengaging the clutch, a source of suction and a valve controlling communication between the latter and said suction motor, together with an electrically-actuated device connected to said valve for opening it, and a foot-operated control switch for said electrical device mounted on the accelerator pedal, said electrically-actuated device being in the nature of a solenoid which opens the valve when energized, and the control switch being arranged in the solenoid circuit, said switch being normally closed but adapted to be opened by the pressure of the driver's foot.

3. In a motor vehicle having an engine, a clutch, and an accelerator pedal for the engine, a suction-actuated motor connected for disengaging the clutch, a source of suction and a valve controlling communication between the latter and said suction motor, together with an electrically-actuated device connected to said valve for opening it, and a foot-operated control switch for said electrical device mounted on the accelerator pedal, said suction-actuated motor being normally effective for holding the clutch in disengaged position, and the control switch serving to break the circuit of the electrically-actuated device when actuated by foot pressure in the same direction as the pressure which operates the accelerator pedal for increasing engine speed, and circuit breaking means operable at will independently of said control switch for throwing the suction motor out of service.

4. In a motor vehicle having an engine, a clutch, and an accelerator pedal for the engine, a suction cylinder, a piston therein connected for disengaging the clutch, a suction port and a conduit leading therefrom to the intake manifold of the engine with a valve in said conduit and an electrically-actuated device connected to said valve for opening it to admit suction to the cylinder, together with a control element for said device in the form of an auxiliary pedal fulcrumed on the accelerator pedal, and a switch adapted to be opened by pressure upon said auxiliary pedal, said switch controlling the circuit of the electrically actuated device.

5. In the combination defined in claim 4, a bleed port for said cylinder arranged to be closed by said valve when the suction conduit is opened, and to be opened when said conduit is closed by the valve, and means for regulating the capacity of said bleed port.

EARL B. HOUGH.